July 14, 1925.
C. C. BRINTON
1,545,733
DAMPER WINDING SUPPORT
Original Filed July 1, 1924
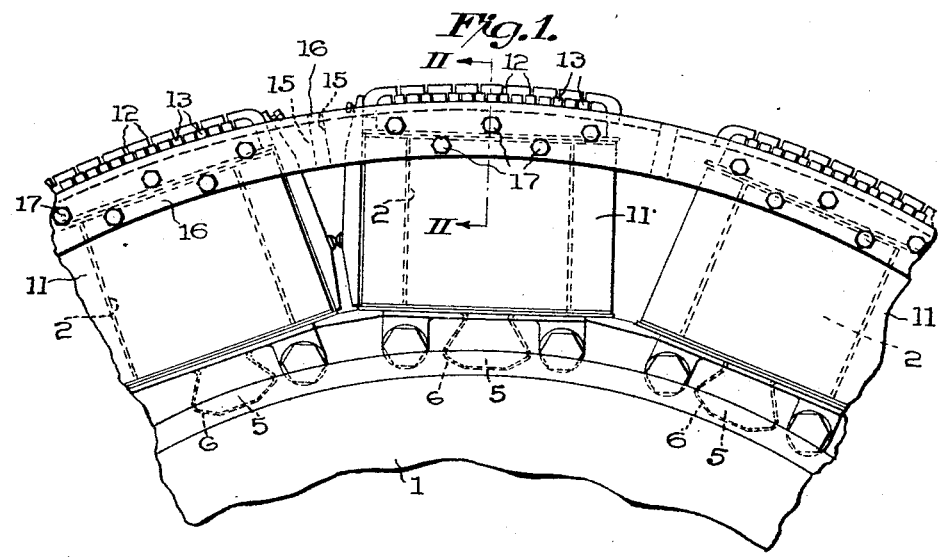
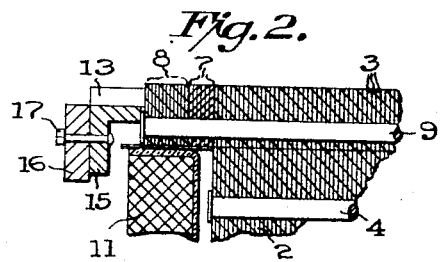
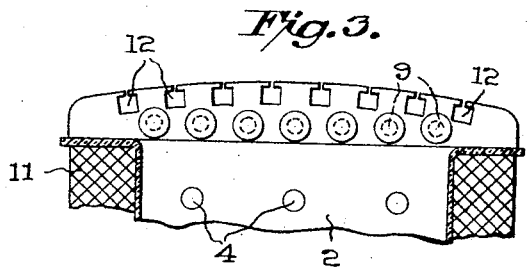
WITNESSES:
R. S. Harrison
INVENTOR
Charles C. Brinton
BY
Wesley G. Carr
ATTORNEY Patented July 14, 1925.

1,545,733

UNITED STATES PATENT OFFICE.

CHARLES C. BRINTON, OF EDGEWOOD, PENNSYLVANIA, ASSIGNOR TO WESTINGHOUSE ELECTRIC & MANUFACTURING COMPANY, A CORPORATION OF PENNSYLVANIA.

DAMPER-WINDING SUPPORT.

Application filed July 1, 1924, Serial No. 723,477. Renewed April 2, 1925.

*To all whom it may concern:*

Be it known that I, CHARLES C. BRINTON, a citizen of the United States, and a resident of Edgewood, in the county of Allegheny and State of Pennsylvania, have invented a new and useful Improvement in Damper-Winding Supports, of which the following is a specification.

My invention relates to dynamo-electric machines and it has particular relation to a field-pole construction for supporting damper windings which are designed only for use in making the machine self-starting and are, therefore, of limited capacity.

The object of my invention is to provide novel features of construction which have been found in practice to produce a highly meritorious apparatus avoiding many of the shortcomings of prior machines.

On polyphase synchronous machines, the damper winding is ordinarily designed only for use in making the machine self-starting and, therefore, is in service for only a very short time during each starting operation. For this reason, the capacity of the damper winding is made very limited, providing little margin for unusual conditions of operation in which the damper winding may be called into service. When abnormal conditions cause a burnout in the damper winding, the failure usually occurs in the imbedded portion of the bar where there is no additional material to absorb the heat generated. Furthermore, since this portion of the bar is unsupported, it will be destroyed by the centrifugal force of rotation at a lower temperature than the imbedded and supported portion.

Furthermore, in the usual damper construction, it has been necessary to employ malleable iron castings which are difficult to obtain and require special shop fixtures for their manufacture.

A more specific object of my invention, thereofore, is to provide a punched-lamination construction which shall replace the malleable iron castings previously used for supporting the ends of the damper bars and which shall be so designed as to provide the necessary heat storage capacity for preventing the end parts of the damper bars from reaching a dangerous temperature.

With the foregoing and other objects in view, my invention consists in the details and features of construction hereinafter described and claimed and illustrated in the acompanying drawing, wherein Figure 1 is an elevational view of a portion of the salient-pole rotor member of a dynamo-electric machine provided with a damper winding in accordance with my invention, Fig. 2 is a sectional view of a pole member illustrated in Fig. 1, taken along the line II—II thereof, and Fig. 3 is a detail elevational view showing the pole piece with the damper winding removed.

As shown in the accompanying drawing, my invention relates to the field member of a dynamo-electric machine which may comprise a central body member or yoke 1 to which are secured a plurality of polar projections 2 comprising iron laminations 3 assembled and held together by means of rivets 4 and mounted in the yoke 1 by means of dove-tail projections 5 and corresponding dove-tail grooves 6 in the yoke. The tips of the polar projections 2 are built up laterally by means of additional laminations 7 and 8 which are held in place by means of rivets 9 which extend throughout the entire length of the pole and the additional laminations 7 and 8 on both ends. Field coils 11 are mounted upon the pole pieces and may be removed therefrom by detaching the pole pieces from the yoke.

The pole face of the limited polar projections 2, including the additional laminations 7 and 8, are provided with axially extending, partially closed slots 12 in which are imbedded damper bars 13. The damper bars 13 of each pole face extend beyond both ends of the slots and are silver-soldered to angle-sectioned copper segments 15, a segment being provided for each end of each pole piece. The various segments 15 are united by short-circuiting end rings 16 which are clamped to the individual segments by means of bolts 17, whereby the individual damping groups upon the several pole members are short circuited.

The particular construction herein shown utilizes about 3/4 of an inch of brass sheets or laminations 7 immediately next the main portion of the pole pieces 2, in order to prevent the laminated extension 7, 8 from providing a magnetic path which would direct some of the flux into the stationary parts (not shown) from the side instead of on the air-gap surface. The additional laminations 8 which are secured outside of the brass laminations 7 are made of sheet steel. It is possible that, without this non-magnetic spacer, the arrangement might lead to increased iron losses. I do not consider, however, that the utilization of the non-magnetic material is an absolutely essential part of the structure.

It will be apparent, from the foregoing description, that I have provided a construction in which the damper bar is imbedded in the pole and in the built-up supporting extension, up to the point where it is attached to the end ring. Thus, the weak point of the damper winding, from the standpoint of heat capacity, is entirely eliminated, and the ability of the winding to operate under abnormal and severe conditions is very greatly increased.

It is also obvious, from an inspection of my construction, that the damper winding is supported in a substantial manner well adapted to meet the growing demand for machines used in connection with hydro-electric stations, since such machines must operate at from 80 to 100 percent above normal speed. My laminated extension 7, 8, which is bolted to the main body of the pole piece, is retained against contrifugal force by means of the bolts and the friction between laminations, thereby amply supporting the damper winding against rotational stresses.

The material for making my new support, or laminated extension 7, 8, is punched with dies built for other purposes from standard stock sheet material, which constitutes a decided manufacturing advantage, as compared with the difficult casting necessary in previous designs.

I claim as my invention:

1. In an alternating-current synchronous machine, a field member having laminated polar projections, field windings thereon, the tips of said polar projections having lateral extensions built up of additional laminations, fastening means extending through the main body of said polar projections and said additional laminations for clamping the same together, the pole faces of said polar projections, including said lateral extensions, being slotted, damping bars of limited capacity, suitable for starting duty only, disposed within the slots, and short-circuiting means connecting the ends of said bars adjacent said lateral extensions, the slotted laminations of said lateral extensions furnishing the bars with additional heat storage capacity necessary to prevent excessive local heating under abnormal operating conditions.

2. In an alternating-current synchronous machine, a rotatable field member having laminated polar projections, field windings thereon, the tips of said polar projections having lateral extensions built up of additional laminations, fastening means extending through the main body of said polar projections and said additional laminations for clamping the same together, the pole faces of said polar projections, including said lateral extensions, being slotted, damping bars of limited mechanical strength disposed within the slots, and short-circuiting means connecting the ends of said bars adjacent said lateral extensions, the slotted laminations of said lateral extensions furnishing the bars with additional mechanical support necessary to prevent local buckling under abnormal speed conditions.

3. In an alternating-current synchronous machine, a field member having laminated polar projections, field windings thereon, the tips of said polar projections having lateral extensions built up of additional laminations, fastening means extending through the main body of said polar projections and said additional laminations for clamping the same together, the pole faces of said polar projections, including said lateral extensions, being slotted, damping bars disposed within the slots, and short-circuiting means connecting the ends of said bars adjacent said lateral extensions.

4. In an alternating-current synchronous machine, a field member having laminated polar projections, field windings thereon, the tips of said polar projections having lateral extensions built up of additional laminations, a plurality of said additional laminations adjacent the main body portion of said polar projections being of non-magnetic material, fastening means extending through the main body of said polar projections and said additional laminations for clamping the same together, the pole faces of said polar projections, including said lateral extensions, being slotted, damping bars of limited capacity, suitable for starting duty only, disposed within the slots, and short-circuiting means connecting the ends of said bars adjacent said lateral extensions, the slotted laminations of said lateral extensions furnishing the bars with additional heat storage capacity necessary to prevent excessive local heating under abnormal operating conditions.

5. In an alternating-current synchronous machine, a rotatable field member having laminated polar projections, field windings thereon, the tips of said polar projections having lateral extensions built up of additional laminations, a plurality of said additional laminations adjacent the main body portion of said polar projections being of non-magnetic material, fastening means extending through the main body of said polar projections and said additional laminations for clamping the same together, the pole faces of said polar projections, including said lateral extensions, being slotted, damping bars of limited mechanical strength disposed within the slots, and short-circuiting means connecting the ends of said bars adjacent said lateral extensions, the slotted laminations of said lateral extensions furnishing the bars with additional mechanical support necessary to prevent local buckling under abnormal speed conditions.

6. In an alternating-current synchronous machine, a field member having laminated polar projections, field windings thereon, the tips of said polar projections having lateral extensions built up of additional laminations, a plurality of said additional laminations adjacent the main body portion of said polar projections being of non-magnetic material, fastening means extending through the main body of said polar projections and said additional laminations for clamping the same together, the pole faces of said polar projections, including said lateral extensions, being slotted, damping bars disposed within the slots, and short-circuiting means connecting the ends of said bars adjacent said lateral extensions.

In testimony whereof, I have hereunto subscribed my name this 30th day of June 1924.

CHARLES C. BRINTON.